W. K. THOMAS.
VARIABLE SPEED TRANSMISSION MECHANISM.
APPLICATION FILED MAR. 16, 1920.
1,378,634.
Patented May 17, 1921.
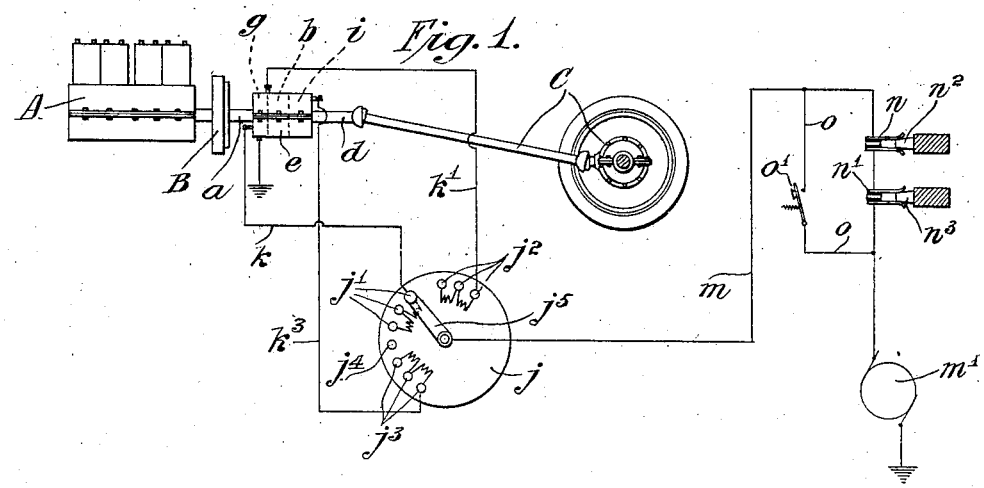
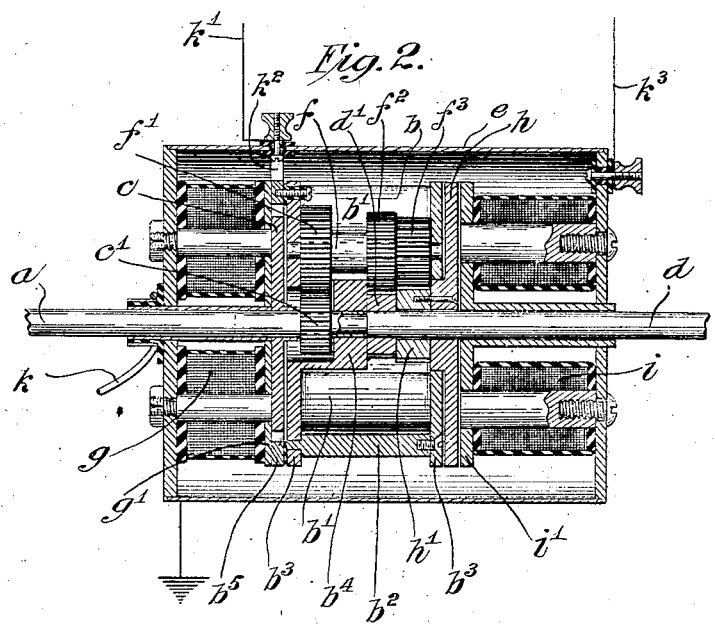
Walter K. Thomas, INVENTOR
his ATTORNEY.

UNITED STATES PATENT OFFICE.

WALTER K. THOMAS, OF BROOKLYN, NEW YORK.

VARIABLE-SPEED-TRANSMISSION MECHANISM.

1,378,634.   Specification of Letters Patent.   Patented May 17, 1921.

Application filed March 16, 1920. Serial No. 366,261.

*To all whom it may concern:*

Be it known that I, WALTER K. THOMAS, a citizen of the United States, residing at the borough of Brooklyn, in the city of New York, county of Kings, and State of New York, have invented certain new and useful Improvements in Variable-Speed-Transmission Mechanisms, of which the following is a specification, reference being had therein to the accompanying drawings, which form a part thereof.

My invention relates to variable speed transmission mechanisms, and more particularly to a magnetic transmission mechanism especially adapted for use in automobiles, motor boats, or other similar vehicles.

A transmission mechanism made in accordance with my invention is so constructed that it may, by means of a selectively operative controller, be made to transmit power from a driving shaft to a driven shaft in a manner to turn the driven shaft in the same, or in a reverse, direction to that of the driving shaft, it being possible to so control the direct drive of said driven shaft as to maintain it at the same speed as the driving shaft, or at a variable speed, as desired.

When the transmission is used with an automobile, the gearing connecting the driving and the driven shafts is so arranged that I am enabled to secure a high or a low speed of the driven shaft through the medium of this gearing, and independently of the strength of the magnetic flux, the circuit to the magnets for determining the operative effect of these gears preferably having included therein a variable resistance device so that the strength of the magnets may be varied in a manner to permit either the high or the low speed to be varied within a certain range as a result of magnetic slippage. The magnets embodied in the transmission are so arranged as to develop a torque sufficient to insure an effective transmission of power through the mechanism, and the gears of the train connecting the two shafts and controlling the reversing action are so proportioned as to insure any desired ratio of speeds of the two shafts.

In addition to the above characteristics, I provide an electrical control for the circuits to the magnets which will not only permit variation of the E. M. F. of the circuit to the magnets, but also arrange in this circuit, make and break mechanisms controlled by the brake mechanisms of the vehicle, so that when the brakes are set, power cannot be applied to the transmission mechanism.

The supplemental circuit control actuated by the brake mechanisms of the machine, is particularly adapted for use in preventing the transmission of power to the driving wheels while the brakes are set, it being desirable, however, to provide manually operative means through which the circuit may be closed around said supplemental controls, to permit the application of power to the transmission mechanism to be synchronized with the actuation of the brake mechanism while the vehicle is in motion as in hill climbing, or when it is desired to reverse the vehicle when descending a grade, or in the event of an emergency as in the failure of the brakes.

In a transmission made in accordance with my invention, power is transmitted from the driving to the driven shaft through the medium of gears acting either as a clutch for the direct drive, or as a gear train for the reverse drive, magnets being employed to control the operative effect of such gears. When, as for use in an automobile, the construction is such as to provide more than one speed in the direct drive, aside from the variable speed resulting from magnetic slippage, the controlling mechanism is so constructed that the magnet determining the highest speed will be deënergized before the magnet controlling the lower speed is energized, and both of the direct drive magnets will be deënergized before the magnet controlling the reverse drive can be energized, thus necessitating a gradual reduction of the speed of transmission before the direct drive can be reversed, or a gradual pick-up of speed in throwing the transmission into high.

The invention consists primarily in a variable speed transmission mechanism embodying therein a driving shaft, a magnet carried by and rotatable therewith, an armature idly mounted upon said shaft, a gear wheel carried by said armature, a driven shaft, a gear wheel carried by and rotatable therewith, a rotatable shaft carried by said magnet, gears carried thereby and rotatable therewith meshing with said gear upon said armature and said gear upon said driven shaft respectively, and means controlling the circuit to said magnet; and in such other novel features of construction and combination of parts as are hereinafter set forth and described, and more particularly pointed out in the claims hereto appended.

Referring to the drawings,

Figure 1 is a diagrammatic showing of a transmission mechanism made in accordance with my invention, and a controlling mechanism therefor as applied to an automobile; and Fig. 2 is a cross-sectional view of the transmission mechanism.

Like letters refer to like parts in both of said views.

In the embodiment of my invention shown in the drawings, I have illustrated a form thereof especially adapted for use in automobiles, wherein I provide for a positive direct drive at two speeds and a reverse drive.

In this form of the invention, I employ a driving shaft $a$ which may be connected directly to the crank shaft of an internal combustion engine A, or indirectly therewith, through the ordinary clutch mechanism shown at B. Carried by and rotatable with the shaft $a$ is an electromagnet $b$ formed of a plurality of spools $b'$ and distance studs $b^2$, the ends of the cores of said spools and of said studs projecting through end plates $b^3$ of non-magnetic material, so as to limit the attraction of said magnets to a point adjacent the edge of said plates $b^3$, and thus afford sufficient leverage of the magnetic clutch to develop the desired torque in the operation of the transmission mechanism.

Idly mounted upon said shaft $a$ is an armature $c$ carrying a gear wheel $c'$ seated within a recess of the hub $b^4$ of the magnet $b$.

The driven shaft $d$, which may be connected in any desired manner, as by an ordinary differential gearing and driving shaft C, to the driving wheels of the vehicle, carries a gear wheel $d'$ also positioned within the magnet $b$, said gear wheel having a relatively greater number of teeth than the gear wheel $c'$. The shafts $a$ and $d$ are in axial alinement, one with the other, and are both rotatably mounted in suitable bearings in the housing $e$ of the mechanism.

Mounted between the end plates $b^3$ of the magnet $b$ is a revoluble shaft $f$ carrying the gears $f'$ and $f^2$ which are rotatable therewith, said gears being constantly in mesh with the gears $c'$ and $d'$ respectively so as to act as a clutch for transmitting power from the driving shaft to the driven shaft during the direct drive secured by means of said mechanism when the magnet $b$ is energized, while permitting the driving shaft $a$ to run idly when said magnet is deënergized.

The gears $c'$, $d'$, $f'$ and $f^2$ each have a different number of teeth, primarily for the purpose of securing variance in the speed in the driven shaft $d$ either as a result of magnetic slippage between the magnet $b$ and the armature $c$, or through the employment of a magnetic control for reducing the speed of the driven shaft in a predetermined ratio, which will be hereinafter described.

The gear $f'$ has a relatively greater number of teeth than the gears $c'$ and $f^2$, the number of teeth upon the gear $f^2$ being greater than the number of teeth upon the gear $c'$ or upon the gear $d'$, and the number of teeth upon the gear $d'$ being greater than the number of teeth upon the gear $c'$, the ratio of the number of teeth in these different gears varying according to the desired predetermined relative speeds of the shafts $a$ and $d$ with a maximum pull of the magnet $g$.

In the form of the invention shown, the ratio of the teeth of the gears $c'$ and $f'$ is 2 to 3, of the gears $f'$ and $f^2$ is 15 to 13, and of the gears $f^2$ and $d'$ is 13 to 12. This ratio, however, may be varied at will.

Carried by the casing $e$ adjacent the armature $c$ is an immovable electromagnet $g$ adapted, when energized, to attract the armature $c$ and prevent any rotary movement thereof and of the gear $c'$, or permit only a limited movement thereof as determined by magnetic slippage between said armature and said magnet. This magnet $g$ also consists of a plurality of spools, the cores of which project through a non-magnetic plate $g'$ at a point remote from the shaft $a$, so as to resist any tendency of the armature $c$ to turn when said magnet $g$ is energized to develop its maximum pull.

Idly mounted upon the shaft $d$ adjacent the gear $d'$ is an armature $h$ carrying a gear wheel $h'$ positioned within the magnet $b$ and constantly in mesh with a gear $f^3$ carried by and rotatable with the shaft $f$. The gear $h'$ has a relatively greater number of teeth than the gears $c'$ and $d'$, while the gear $f^3$ has a relatively less number of teeth than the gear $f'$ or $f^2$, the gear $h'$, however, having a relatively greater number of teeth than said gear $f^3$. The ratio of the teeth of the gears $f'$ and $f^3$ in the form of the invention shown, is 15 to 12, while that of the gears $f^3$ and $h'$ is 12 to 13, this ratio, however, being subject to variation according to the desired speed of the reverse drive of the shaft $d$.

Immovably attached to the casing $e$ adjacent the armature $h$ is an electromagnet $i$ formed of a plurality of spools, the cores of which respectively project through an end plate $i'$ of non-magnetic material, at a point more or less remote from the shaft $d$, so as to develop the desired leverage, and thus increase the holding power of said magnet with relation to the armature $h$.

The various magnets $b$—$g$—$i$ are adapted to be selectively energized from the same source of power, which may be either a storage battery or a D. C. generator, or both, as desired, or all of said magnets may be disconnected from said source of power.

The circuits to the respective magnets are controlled by means of a rheostat switch $j$ containing three groups of contacts each having a plurality of points connected by suitable resistance coils or other devices. One of these groups as $j'$ is connected by means of the terminal wire $k$ with the electromagnet $g$. Another of said groups as $j^2$ is connected by means of the terminal wire $k'$ with a contact brush $k^2$ engaging a ring $b^5$ carried by, and insulated from, one of the end plates $b^3$ of the magnet $b$, and electrically connected with each of the coils forming a part of said magnets. The other group of contacts $j^3$ is electrically connected by means of the terminal wire $k^3$ with the magnet $i$. Arranged intermediate the groups of contacts $j'$ and $j^3$ is a neutral point $j^4$.

Electrically connected through the wire $m$ with a generator, storage battery $m'$, or other source of D. C. current, is a movable contact $j^5$ adapted to engage the contact points of any group. In this manner the current may be delivered to any one of the magnets as desired, or to none of them, and the strength of the magnetic flux may be controlled so as to permit magnetic slippage between a magnet and its associated armatures $c$ and $h$, so as to permit the variance of the speed of the driven shaft from that determined by the ratio of the gears of the gearing system.

Arranged in the length of the terminal wire $m$ are two gaps formed respectively of opposed spring contacts $n$ and $n'$, said gaps being adapted to be closed by means of a contact maker $n^2$ upon the foot brake lever of an automobile, and a contact maker $n^3$ upon the emergency lever thereof, these contacts being so set that when both of said levers are set to release the brakes, the gaps will be closed, but when either or both levers are actuated to set the brakes, the circuit will be open, thus preventing the transmission of power from the engine to the driving wheels.

Under some conditions it is desirable to energize the magnets while the circuit is interrupted by means of said gaps $n$—$n'$, as in hill climbing or in the event of the failure of the brakes, to meet which condition I provide a wire $o$ connected upon opposite sides of auxiliary controlling means afforded by the switches actuated by the brake levers, so as to permit the closing of the circuit about said gaps by means of a manually operative, self opening switch $o'$ arranged in said wire $o$.

The operation of the herein described mechanism is substantially as follows:—

When it is desired to not transmit power from the shaft $a$ to the shaft $d$, the movable contact member $j^5$ will be engaged with the neutral point $j^4$ so that none of the magnets $b$—$g$—$i$ will be energized. Under such conditions, as the magnet $b$ rotates with the shaft $a$, the engagement of the gear $f^2$ with the gear $d'$ will rotate the shaft $f$ about its own axis, while it is having planetary movement about the shafts $a$ and $d$. The resultant rotation of the gears $f'$ and $f^3$ will, by reason of their engagement with the gears $c'$ and $h'$, merely rotate the armatures $c$ and $h$, the former in a direction the reverse of and the latter slowly in the same direction as that in which the shaft $a$ is rotated.

When it is desired to impart a direct drive to the shaft $d$ and rotate it in the same direction as the shaft $a$, the contact member $j^5$ will be swung to the right into engagement with the group $j'$ of contact points, thus energizing the magnet $g$, the degree of saturation of this magnet being determined by the amount of resistance included in the circuit $m$—$k$ by the controller $j$.

Upon the energization of said magnet $g$, said magnet will attract the armature $c$ and hold it against the rotary movement above referred to, or limit this rotary movement to an extent determined by the magnetic slippage resulting from the inclusion of resistance in the circuit to the magnet. Assuming that all such resistance is cut out, the armature $c$ will be held stationary, and consequently the gear $c'$ will be held stationary. With this condition, the shaft $f$ will be turned a partial revolution through the engagement of the gears $c'$ and $f'$ with each full rotation of the magnet $b$, thus reducing proportionately the effectiveness of the clutch mechanism afforded by the gears $c'$, $d'$, $f'$ and $f^2$, so that under this condition the shaft $d$ will be rotated in the same direction as, but at a lower speed than, the shaft $a$.

If magnetic slippage is permitted, however, the degree of rotation of the shaft $f$ with each rotation of the magnet $b$ will be increased as a result of the turning of the gear $c'$ and its armature $c$ in the opposite direction, so that the ratio of speed reduction will be increased as a result of this slippage.

If it be desired to increase the speed of the driven shaft $d$, the contact member $j^5$ is passed from the group of contacts $j'$ to the group $j^2$, thus deënergizing the magnet $g$ and energizing the magnet $b$. Assuming that all of the resistance is cut out from the circuit $m$—$k'$, this will result in the magnet $b$ attracting the armature $c$ so as to cause it and its gear $c'$ to rotate in unison with the magnet $b$ and the shaft $a$. As a result, there will be no rotation of the shaft $f$, and the engagement of the gears $c'$—$f'$—$d'$—$f^2$ will form a direct coupling which will result in the rotation of the shaft $d$ at the same speed and in the same direction as the shaft $a$, and cause the armature $h$ to rotate in unison with the magnet $b$.

If resistance is included in the circuit, however, magnetic slippage between the armature $c$ and the magnet $b$ will permit a slight rotation of said armature independently of the magnet $b$ and in the reverse direction, thus permitting a slow rotation of the shaft $f$ and of the gears $f'$ and $f^2$ thereon, with a resultant reduction of speed of the driven shaft $d$. In order to secure the desired result the number of teeth upon the various gears $c'$ and $f'$, $f^2$ and $d'$, must vary, as heretofore described, although it is not essential that the gears shall have the exact number of teeth herein specified, this being largely a matter of design in determining the ratio of speed reduction.

If it be desired to reverse the direction of drive, the contact member $j^5$ is disengaged from the contact groups $j'$ and $j^2$, passed across the neutral point $j^4$ and engaged with some contact of the group $j^3$, thus deënergizing the magnets $b$ and $g$ and energizing the magnet $i$, the neutral contact point $j^4$ and the relation of the groups of contacts $j'$ and $j^2$ insuring a gradual reduction of speed of the shaft $d$, and a condition where the transmission mechanism is fully inoperative before the reverse can be thrown in.

As the magnet $i$ is energized, it will attract the armature $h$ and hold it against rotary movement, so that the continued rotation of the magnet $b$ will, through the gears $h'$ and $f^3$, rotate the shaft $f$ in the same direction as heretofore referred to in connection with the armature $c$ and its gear $c'$, said shaft, however, turning more than one full revolution with each rotation of the magnet $b$ and shaft $a$, the extent of this excess rotation of said shaft being determined by the difference in the number of teeth in the gears $h'$ and $f^3$ as heretofore described. The engagement of the rotating gear $f^2$ with the gear $d'$ will result in the rotation of said last named gear and of the shaft $d$ at a lower speed than, but in the reverse direction from, the direction of rotation of the shaft $a$. By including resistance in the circuit $m$—$h^3$, magnetic slippage is afforded between the armature $h$ and the magnet $i$ which will permit a very slow movement of said armature with the magnet $b$ and a consequent reduction of speed in the shaft $d$.

The operation of the reversing mechanism heretofore described, results from that construction employing a gear $h'$ having a greater number of teeth than the gear $f^3$, and a gear $f^2$ having a greater number of teeth than the gear $d'$.

If either the foot brake or the emergency brake be set, it is apparent that it is impossible to energize any of the magnets $b$—$g$—$i$, unless the operator shall close the circuit about these auxiliary control switches by means of the manually operative, automatically opening switch $o'$. Consequently it is impossible to apply power to the driving gear while these brakes are set, without the knowledge of the operator.

The switch $o'$ may also be used to insure the application of power through the transmission mechanism substantially simultaneously with the release of a foot brake, when such is desired, as when a vehicle is stopped upon a hill, or when it is desired to throw in the reverse when a vehicle is descending a hill and the foot brake is not holding.

While in the accompanying drawings, I have shown magnets consisting of spool windings, and armatures consisting of a single flat plate, it is apparent that any desired construction of magnet may be employed to secure the desired magnetic traction, the details of construction of the magnet and armature being a matter within the province of one skilled in this class of work.

It is also apparent that the substitution of magnets for armatures and armatures for magnets, in the construction shown, would involve a mere reversal of parts and not depart from the spirit and scope of the invention.

Having described the invention, what I claim as new and desire to have protected by Letters Patent, is:—

1. A variable speed transmission mechanism embodying therein a driving shaft, a member carried by and rotatable therewith, a gear wheel loosely mounted thereon, a driven shaft, a gear wheel carried by and rotatable therewith, a rotatable shaft carried by said member, gears carried thereby and rotatable therewith meshing with said gear upon said driving shaft and said gear upon said driven shaft respectively, an electromagnet and an armature coöperating therewith, one of which is carried by said member and the other of which is operative upon said gear wheel upon said driving shaft, and means controlling the circuit to said magnet.

2. A variable speed transmission mechanism embodying therein a driving shaft, a member carried by and rotatable therewith, a gear wheel loosely mounted thereon, a driven shaft, a gear wheel carried by and rotatable therewith, a rotatable shaft carried by said member, gears carried thereby and rotatable therewith meshing with said gear upon said driving shaft and said gear upon said driven shaft respectively, an electromagnet and an armature coöperating therewith, one of which is carried by said member and the other of which is operative upon said gear wheel upon said driving shaft, means controlling the circuit to said magnet, and means operative to prevent movement of said gear upon said driving shaft, whereby said driven shaft may be rotated at a reduced speed compared with said driving shaft.

3. A variable speed transmission mechanism embodying therein a driving shaft, a member carried by and rotatable therewith, a gear wheel loosely mounted thereon, an electromagnet and an armature coöperating therewith, one of which is carried by said member and the other of which is operative upon said gear wheel upon said driving shaft, a driven shaft, a gear wheel carried by and rotatable therewith, a gear idly mounted upon said driven shaft, a coöperating electromagnet and armature, one of which is immovable and the other of which is connected with said last named gear, a rotatable shaft carried by said member, gears carried thereby and rotatable therewith meshing with said gear upon said driving shaft, said gear upon said driven shaft, and said gear idly mounted upon said driven shaft respectively, said gear upon said driven shaft having a larger number of teeth than the gear meshing therewith, whereby when said first named magnet is energized, power will be transmitted to said driven shaft in one direction, and when said last named magnet is energized, power will be transmitted thereto in the reverse direction, and means controlling the circuit to selectively energize said magnets.

4. A variable speed transmission mechanism embodying therein a driving shaft, a member carried by and rotatable therewith, a gear wheel loosely mounted thereon, an electromagnet and an armature coöperating therewith, one of which is carried by said member and the other of which is operative upon said gear wheel upon said driving shaft, a driven shaft, a gear wheel carried by and rotatable therewith, a gear idly mounted upon said driven shaft, a coöperating electromagnet and armature, one of which is immovable and the other of which is operatively connected with said last named gear, a rotatable shaft carried by said member, gears carried thereby and rotatable therewith meshing with said gear upon said driving shaft, said gear upon said driven shaft, and said gear idly mounted upon said driven shaft respectively, said gear upon said driven shaft having a larger number of teeth than the gear meshing therewith, whereby when said first named magnet is energized, power will be transmitted to said driven shaft in one direction, and when said last named magnet is energized, power will be transmitted thereto in the reverse direction, means controlling the circuit to selectively energize said magnets, and means operative to prevent movement of said gear upon said driving shaft, whereby said driven shaft may be rotated at a reduced speed compared with said driving shaft.

5. A variable speed transmission mechanism embodying therein a driving shaft, a member carried by and rotatable therewith, a gear wheel loosely mounted thereon, an electromagnet and an armature coöperating therewith, one of which is carried by said member and the other of which is operative upon said gear wheel upon said driving shaft, a driven shaft, a gear wheel carried by and rotatable therewith, a gear idly mounted upon said driven shaft, a coöperating electromagnet and armature, one of which is immovable and the other of which is connected with said last named gear, a rotatable shaft carried by said member, gears carried thereby and rotatable therewith meshing with said gear upon said driving shaft, said gear upon said driven shaft, and said gear idly mounted upon said driven shaft respectively, said gear upon said driven shaft having a larger number of teeth than the gear meshing therewith, whereby when said first named magnet is energized, power will be transmitted to said driven shaft in one direction, and when said last named magnet is energized, power will be transmitted thereto in the reverse direction, and circuit controlling means whereby said magnets may be selectively energized, said means including therein resistance devices whereby the traction of said magnets may be varied.

6. A variable speed transmission mechanism embodying therein a driving shaft, a magnet carried by and rotatable therewith, an armature idly mounted upon said shaft, a gear wheel carried by said armature, a driven shaft, a gear wheel carried by and rotatable therewith, a rotatable shaft carried by said magnet, gears carried thereby and rotatable therewith meshing with said gear upon said armature and said gear upon said driven shaft respectively, and means controlling the circuit to said magnet.

7. A variable speed transmission mechanism embodying therein a driving shaft, a magnet carried by and rotatable therewith, an armature idly mounted upon said shaft, a gear wheel carried by said armature, a driven shaft, a gear wheel carried by and rotatable therewith, a rotatable shaft carried by said magnet, gears carried thereby and rotatable therewith meshing with said gear upon said armature and said gear upon said driven shaft respectively, an electromagnet immovably mounted in operative relation to said armature, whereby said armature and its gear may be held against rotation with or independently of said first named magnet, and circuit controlling means adapted to selectively energize said magnets, or interrupt the circuit thereto.

8. A variable speed transmission mechanism embodying therein a driving shaft, a magnet carried by and rotatable therewith, an armature idly mounted upon said shaft, a gear wheel carried by said armature, a driven shaft, a gear wheel carried by and rotatable therewith, a rotatable shaft carried by said magnet, gears carried thereby and rotatable therewith meshing with said gear upon said armature and said gear upon said driven shaft respectively, an electromagnet immovably mounted in operative relation to said armature, whereby said armature and its gear may be held against rotation with or independently of said first named magnet, and circuit controlling means adapted to selectively energize said magnets, or interrupt the circuit thereto, said circuit including therein resistance devices whereby the traction of said magnets may be varied.

9. A variable speed transmission mechanism embodying therein a driving shaft, a magnet carried by and rotatable therewith, an armature idly mounted upon said shaft, a gear wheel carried by said armature, a driven shaft, a gear wheel carried by and rotatable therewith, an armature idly mounted upon said driven shaft, a gear carried thereby, an electromagnet immovably mounted in operative relation to said last named armature, whereby said armature may be held against rotation with or independently of said first named magnet, a rotatable shaft carried by said first named magnet, gear wheels carried thereby and rotatable therewith meshing with said gears upon said first named and said last named armature respectively, and said gear carried by said driven shaft, said gear upon said last named armature having a greater number of teeth than the gear meshing therewith, and circuit controlling means adapted to selectively energize said magnets, or interrupt the circuit thereto.

10. A variable speed transmission mechanism embodying therein a driving shaft, a magnet carried by and rotatable therewith, an armature idly mounted upon said shaft, a gear wheel carried by said armature, a driven shaft, a gear wheel carried by and rotatable therewith, an electromagnet immovably mounted in operative relation to said armature, whereby said armature may be held against rotation with or independently of said first named magnet, an armature idly mounted upon said driven shaft, a gear carried thereby, an electromagnet immovably mounted in operative relation to said last named armature, whereby said armature may be held against rotation with or independently of said first named magnet, a rotatable shaft carried by said first named magnet, gear wheels carried thereby and rotatable therewith meshing with said gears upon said first named and said last named armature respectively, and said gear carried by said driven shaft, said gear upon said last named armature having a greater number of teeth than the gear meshing therewith, and circuit controlling means adapted to selectively energize said magnets, or interrupt the circuit thereto.

11. A variable speed transmission mechanism embodying therein a driving shaft, a magnet carried by and rotatable therewith, an armature idly mounted upon said shaft, a gear wheel carried by said armature, a driven shaft, a gear wheel carried by and rotatable therewith, an electromagnet immovably mounted in operative relation to said armature, whereby said armature may be held against rotation with or independently of said first named magnet, an armature idly mounted upon said driven shaft, a gear carried thereby, an electromagnet immovably mounted in operative relation to said last named armature, whereby said armature may be held against rotation with or independently of said first named magnet, a rotatable shaft carried by said first named magnet, gear wheels carried thereby and rotatable therewith meshing with said gears upon said first named and said last named armature respectively, and said gear carried by said driven shaft, said gear upon said last named armature having a greater number of teeth than the gear meshing therewith, and circuit controlling means adapted to selectively energize said magnets, or interrupt the circuit thereto, said circuit including therein resistance devices whereby the traction of said magnets may be varied.

12. A variable speed transmission mechanism embodying therein a driving shaft, a magnet carried by and rotatable therewith, an armature idly mounted upon said shaft, a gear wheel carried by said armature, a driven shaft, a gear wheel carried by and rotatable therewith, an armature idly mounted upon said driven shaft, a gear carried thereby, an electromagnet immovably mounted in operative relation to said last named armature, whereby said armature may be held against rotation with or independently of said first named magnet, a rotatable shaft carried by said first named magnet, gear wheels carried thereby and rotatable therewith meshing with said gears upon said first named and said last named armature respectively, and said gear carried by said driven shaft, said gear upon said last named armature having a greater number of teeth than the gear meshing therewith, and circuit controlling means adapted to selectively energize said magnets, or interrupt the circuit thereto, said circuit including therein resistance devices whereby the traction of said magnets may be varied.

13. A variable speed transmission mechanism embodying therein a driving shaft, a member carried by and rotatable therewith, a gear wheel loosely mounted thereon, a driven shaft, a gear wheel carried by and rotatable therewith, a rotatable shaft carried by said member, gears carried thereby and rotatable therewith meshing with said gear upon said driving shaft and said gear upon said driven shaft respectively, an electromagnet and an armature coöperating therewith, one of which is carried by said member and the other of which is operative upon said gear wheel upon said driving shaft, means controlling the circuit to said magnet, and an auxiliary circuit controlling means comprising contacts at a gap in the circuit to said magnet and a coöperating contact member carried by a movable brake lever of a vehicle, whereby the circuit to the magnet cannot be closed while the brake is set.

14. A variable speed transmission mechanism embodying therein a driving shaft, a member carried by and rotatable therewith, a gear wheel loosely mounted thereon, a driven shaft, a gear wheel carried by and rotatable therewith, a rotatable shaft carried by said member, gears carried thereby and rotatable therewith meshing with said gear upon said driving shaft and said gear upon said driven shaft respectively, an electromagnet and an armature coöperating therewith, one of which is carried by said member and the other of which is operative upon said gear wheel upon said driving shaft, means controlling the circuit to said magnet, and an auxiliary circuit controlling means comprising contacts at a gap in the circuit to said magnet, a coöperating contact member carried by a movable brake lever of a vehicle, whereby the circuit to the magnet cannot be closed while the brake is set, and an electroconductor connected with the main circuit upon opposite sides of said gap and having therein a manually operative, self opening switch, whereby the circuit may be closed while said gap is open.

15. A variable speed transmission mechanism embodying therein a driving shaft, a magnet carried by and rotatable therewith, an armature idly mounted upon said shaft, a gear wheel carried by said armature, a driven shaft, a gear wheel carried by and rotatable therewith, an electromagnet immovably mounted in operative relation to said armature, whereby said armature may be held against rotation with or independently of said first named magnet, an armature idly mounted upon said driven shaft, a gear carried thereby, an electromagnet immovably mounted in operative relation to said last named armature, whereby said armature may be held against rotation with or independently of said first named magnet, a rotatable shaft carried by said first named magnet, gear wheels carried thereby and rotatable therewith meshing with said gears upon said first named and said last named armature respectively, and said gear carried by said driven shaft, said gear upon said last named armature having a greater number of teeth than the gear meshing therewith, said gear upon said driven shaft having a lesser number of teeth than said gear upon said last named armature and the gear meshing therewith, and said gear upon said first named armature having a lesser number of teeth than the gear upon said driven shaft and the gear meshing therewith, and circuit controlling means adapted to selectively energize said magnets, or interrupt the circuit thereto.

In witness whereof I have hereunto affixed my signature, in the presence of two subscribing witnesses, this 15th day of March, 1920.

WALTER K. THOMAS.

Witnesses:
F. T. WENTWORTH,
FRIEDA KOEHLER.